Dec. 11, 1962 V. LODHOLM 3,067,640
TOOL FOR APPLYING BAND CLAMPS
Filed Nov. 16, 1961 2 Sheets-Sheet 1
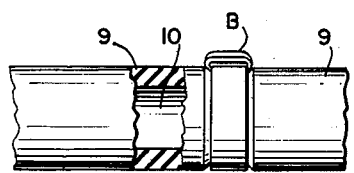
FIG. 1
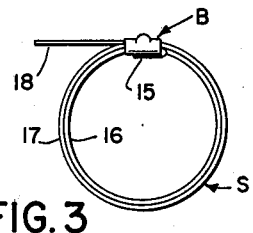
FIG. 3
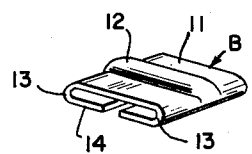
FIG. 2
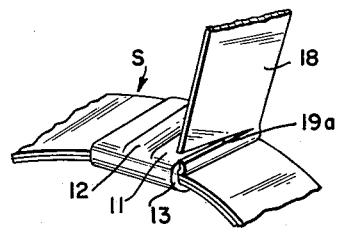
FIG. 5
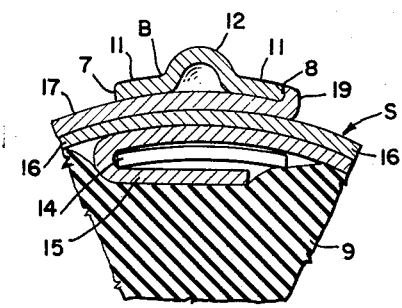
FIG. 4
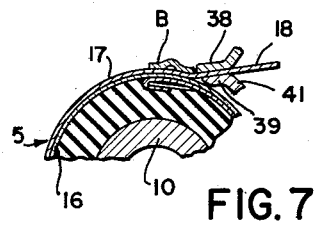
FIG. 7
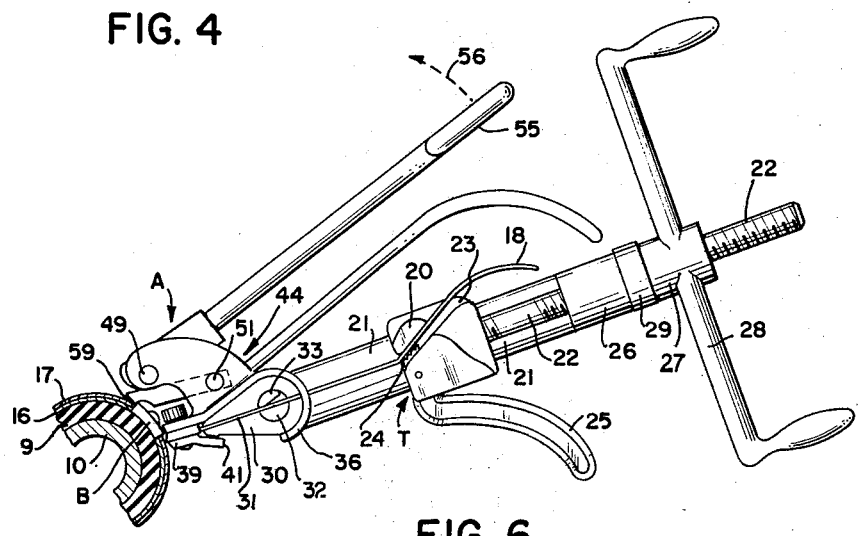
PRIOR ART  FIG. 6

Dec. 11, 1962    V. LODHOLM    3,067,640
TOOL FOR APPLYING BAND CLAMPS
Filed Nov. 16, 1961    2 Sheets-Sheet 2

3,067,640
TOOL FOR APPLYING BAND CLAMPS
Valdemar Lodholm, Golden, Colo., assignor to Band-It Company, Denver, Colo., a corporation of Delaware
Filed Nov. 16, 1961, Ser. No. 152,718
6 Claims. (Cl. 81—9.3)

This invention relates to tools for applying pressure clamps.

Pressure clamps are useful for many purposes, such as for attaching hoses to nipples and the like; for assembling and repairing wooden water pipes, tying conduit or cable to pipes, girders and the like, clamping guy wire guards, fastening street and highway signs to poles, girders and the like, and other construction uses; for splicing electric welding cable, making up flexible cable line taps, and other electrical uses; and for repairing pipe or tank leaks, and other repair uses. Pressure clamps, of the type to which this invention relates, include generally a length of strap or strapping, normally metal, which extends around an article or portion thereof to which the clamp is to be applied, and a buckle or connector by which the ends of the strapping are attached together. Such connectors should be adapted to permit the strapping to be pulled tight, prior to final attachment to the connector, and when a comparatively high clamping pressure is to be maintained, such as in attaching high pressure hoses to nipple and the like, more than one revolution of the strap is generally desirable.

It is customary to attach one end of a length of strap to the buckle or connector, pass the other end of the strap around the article to be clamped one or more times, and then use a special tool to exert a sufficient pull on the free end of the strap, so that the desired clamping pressure is obtained. Such a tool may be of the type shown in United States Patent No. 2,208,114, and may include a slide which is provided with a strap gripping device and is movable along a frame, as by a screw, to apply tension on the strap with the nose of the tool abutting against the buckle or connector. A cutter is mounted in the nose of the frame, for cutting off the unused portion of the strap, while the nose of the tool frame and also the slide are provided with a guide slot, which is open at one side to facilitate insertion of the strap. One type of buckle or connector is provided with ends and sides, an offset transverse central rib, and an upstanding ear at each side, the latter being hammered down over the end of the strap, after the desired tension has been placed thereon and the strap has been bent back over the buckle and the free end cut off. The fixed end of the strap is bent around underneath the central buckle rib prior to installation, and lies against the article to which the clamp is applied. Tools and buckles of the above types are sold widely, being used particularly when extremely high clamping pressures are desired. Such buckles and the straps utilized therewith may be made of stainless steel to provide substantially maximum material strength, but the buckles require relatively complicated stamping operations for manufacture. Also, in the complete clamp, the free end of the strap is exposed and tends to extend from the buckle, thus tending to catch on objects or clothing, as when used as hose clamps. Furthermore, after the free end of the strap has been cut off, it must be hammered down against the buckle and each of the ears also hammered down against the end of the strap, thus increasing the installation time. Mild steel is a suitable strapping material for uses in which the higher strength of stainless steel is not required, and is also cheaper than stainless steel. However, the buckles having ears heretofore used with mild steel strapping have either been difficult or costly to make, or tend to permit the strap to slip long before the load on the strap has approached its tensile strength. Also, a simple buckle which encircles the strap and is either punched into the strap from the top, or deformed at the side so as to deform the strap simultaneously, does not utilize the full strength of the strap.

An improvement in pressure clamps, as disclosed and claimed in United States Patent No. 2,746,107 of Holbrook Mahn permits the buckle and clamp to be made simply and the full strength of the strapping to be utilized, as well as eliminating the previously objectionable exposed free end of the strap. For such a clamp, the buckle may be a flattened U in transverse section, having merely a top, sides, and a bottom split down the center. The top may be provided with one or more transverse ridges, and one end of the strap may merely be passed through the buckle and bent around under the bottom of the buckle. The remainder of the strap passes around the article to be clamped one or more times, each time passing through the buckle, and the opposite end of the strap is tensioned, then bent upwardly against the upper edge of the buckle and cut off. The free end is cut as closely as possible to the edge of the buckle, and filed or otherwise removed so as to be flush with or below the upper surface of the buckle.

A tool for applying pressure clamps of the type disclosed in the above-mentioned Mahn United States Patent No. 2,746,107 is disclosed in United States Patent No. 2,746,324 of Harold H. Beardsley. That tool is usually made in the form of an attachment adapted for use with the older tool such as that disclosed at T in FIG. 6 hereafter described, or as an independent tool for applying only the clamp of the type disclosed in the Mahn Patent No. 2,746,107.

The object of this invention is to provide an improvement on the above identified Beardsley tool. When that tool is used to apply a pressure clamp, the cutter blade cuts off the free end of the strap against the end of the buckle, after the strap is drawn taut. The cut leaves the turned up end of the strap flush with the top of the buckle. The cutting action performed by the Beardsley tool is such that the cutter blade applies cutting force of the same magnitude across the entire width of the strap simultaneously; that is, the force is applied uniformly and simultaneously along the cutter blade at all points across the width of the strap. The cutter blade severs the strap from edge to edge at the same time. That kind of a cut is herein designated as a "pinch" cut to distinguish it from the kind of cutting action performed by a tool constructed according to this invention. A tool constructed according to this invention does not cut the strap in the same manner as the tool disclosed in said United States Beardsley Patent No. 2,746,324. A tool according to this invention, after the strap is pulled taut and bent upwardly into contact with the end of the buckle, cuts the bent up end of the strap flush with the top surface of the buckle by a cutting action in which the strap is cut off progressively from one edge of the strap to the opposite edge of the strap in a manner similar to the action of scissors. For convenience of description, the cut performed by the tool of this invention is herein designated as a "scissor" cut, to differentiate and distinguish it from the pinch cut performed by the tool of said Beardsley patent.

Although the novel features which are believed to be characteristic of this invention are pointed out in the annexed claims, the invention itself as to its objects and advantages, and the manner in which it may be carried out, may be better understood by reference to the following more detailed description, taken in connection with the accompanying drawings, forming a part hereof, in which:

FIG. 1 is a side elevation of a clamp, which the tool of this invention is particularly useful in applying, and shows a hose attached to a ferrule or nipple;

FIG. 2 is a perspective view of a buckle or connector of the clamp of FIG. 1;

FIG. 3 is a side elevation, on a reduced scale of a strap and buckle assembly, which may be utilized in forming the clamp of FIG. 1, being the type of clamp shown in Mahn United States Patent No. 2,746,107;

FIG. 4 is an enlarged, fragmentary transverse section through the clamp of FIG. 1;

FIG. 5 is a view in perspective to ilustrate the kind of cutting action performed on the free end of the strap by a tool constructed according to this invention;

FIG. 6 is a side view of a previous type of tool, with an attachment constructed in accordance with this invention, shown in a position preparatory to cutting and severance of the free end of the strap;

FIG. 7 is a fragmentary section illustrating the use of the tool in application of tension to the clamp strap to pull the strap taut around the hose;

Figure 8:
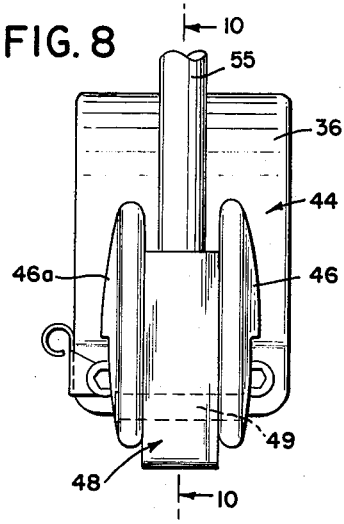
FIG. 8 is a top plan view of the attachment shown in FIG. 6, the handle being broken away.
Figure 9:
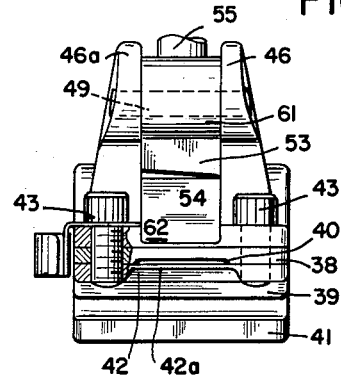
FIG. 9 is a front elevation of the attachment shown in FIG. 8.
Figure 10:
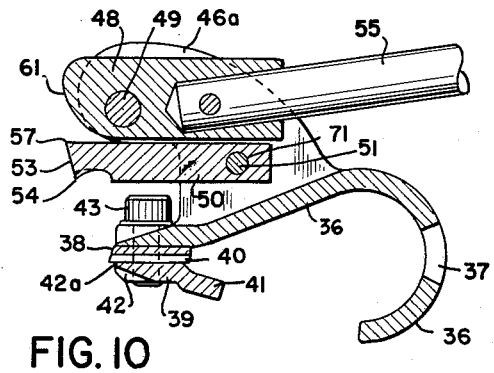
FIG. 10 is a longitudinal section, taken along line 10—10 of FIG. 8.
Figures 11, 11A:
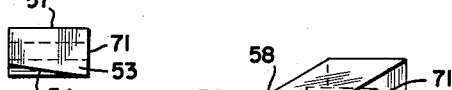
FIG. 11 is a view in perspective of the lever-hook of the tool shown in FIGS. 8 to 10.
FIG. 11a is a front elevation of the lever-hook shown in FIG. 11.
Figure 12:
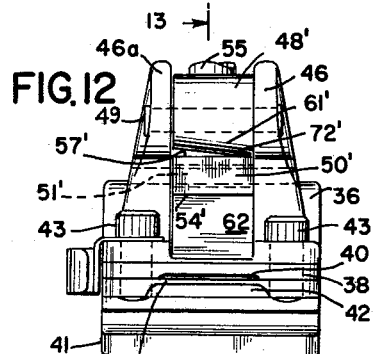
FIG. 12 is a view in elevation of a modification.
Figure 14:
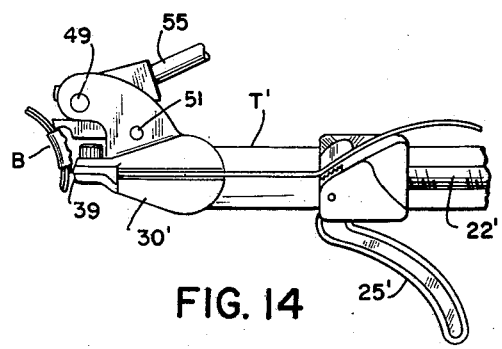
Figure 13:
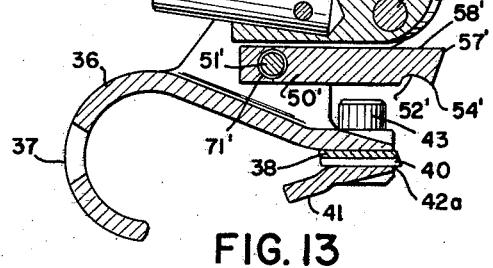

FIG. 13 is a side elevation of the tool shown in FIG. 12 taken on line 13—13 of FIG. 12; and FIG. 14 is a fragmentary elevation, showing the front end of a tool constructed in accordance with this invention, including parts similar to the attachment shown in FIGS. 6 and 8–13 inclusive wherein the tool is of unitary construction as distinguished from a tool comprising an attachment adapted for assembly with another clamp applying tool.

Referring now to the drawings, in which like reference characters indicate like parts throughout the several views, the clamp for which the tool of this invention is adapted for use, may comprise the buckle B adapted to secure the ends of strap S around a hose 9, with sufficient tension on the strap S to securely clamp the hose 9 to nipple 10. It will be understood that the clamp may be applied in other situations, such as those indicated previously, and also that the strap S and buckle B may be made of any desired material, such as mild steel, although stainless steel or material having a lesser or greater tensile strength than mild steel, may be utilized. The buckle B, as shown in FIG. 2, has open ends through which the strap may extend. It may be stamped or otherwise formed, as from flat stock. The top 11 of the buckle may be provided with a transverse ridge 12 or it may have more ridges if greater strength is desired. The sides of the buckle are bent downwardly to form the sides 13 and then inwardly to form the inwardly extending flanges 14, the edges of which form a longitudinal slot.

In applying the pressure clamp of FIG. 3, a fixed end 15 of the strap S may be bent around so as to lie underneath the bottom flanges 14 as in FIG. 4, and more than one layer, such as inner loop 16 and an outer loop 17, passed around the article to be clamped and through the buckle. Tension is applied to the free end portion 18 of the strap, by a suitable tool such as the tool T of FIG. 6, described hereinafter. The strap may be obtained from a continuous roll, but preferably a buckle and strap unit, assembled as shown in FIG. 3 is utilized. In the latter, the fixed end 15 of the strap is bent under the buckle, and two loops 16 and 17 of the strap extend through the buckle, with the free end portion 18 being left sufficiently long to permit the tension tool T to be attached thereto.

In accordance with this invention, after sufficient tension has been applied to the strap, to produce the desired tautness or clamping pressure, the free end portion 18 of the strap is bent upwardly against the end 8 of the buckle top wall 11, and the free end then cut off along a line across the strap as close as possible to the top surface of the buckle, the cut being made progressively from one edge of the strap to the opposite edge of the strap to sever the free end of the strap flush with the top surface of the buckle. The cut made by the tool is a "scissor" cut, as distinguished from a "pinch" cut made by applying the cutting force simultaneously and equally across the strap from edge to sever the free end of the strap flush with the top surface of the buckle.

The tension tool T, shown in FIG. 6, comprises a slide 20 adapted to be moved along a frame 21 by a fixed screw 22, the slide 20 having an angular slot 23 therein, into which the strap may be passed so as to be clamped by the serrated edges of a clamping cam 24, pivotally mounted in the slide 20 and operated by a handle 25. Screw 22 extends through a journal 26, preferably formed integrally with the frame 21 and the outer end thereof. The screw 22 engages an interiorly threaded block 27 which may be rotated by a tension handle 28; the thrust of the handle being transferred through a ball bearing 29 to the frame at journal 26. A substantially V-shaped nose 30 is disposed at the front end of the frame 21, being preferably formed integrally therewith and provided with a longitudinal slot 31 open at one side for insertion of the strap S. In one manner of using the tool T as thus described, the end of the nose 30 is placed against the end of a buckle and the tension handle rotated to pull the free end of the strap through the buckle until the desired tension is obtained.

The nose 30 of the tool T may be provided with a cylindrical, transverse hole 32, in which a tapered cutter 33 is mounted for rotation. As will be evident, the cutter severs the strap S at a point spaced a greater distance from the buckle B than is desired for the present invention. The cutter 33, although particularly useful in installing clamps of a type having bendable ears previously described, is not necessary for carrying out the present invention. However, the cutter 33 may be left on the tool T, and an attachment A of FIG. 6, constructed in accordance with this invention, is mounted thereon, so that the tool T may be used separately for applying the old style clamps; or with the attachment A attached to it, it may be used for installing clamps of the type shown in FIGS. 3 and 4 herein.

The attachment A, as shown in FIGS. 6 and 8–11a, comprises a frame 36 which may be constructed so as to partially encircle the nose 30 of the tool T. It is provided with a slot 37 as in FIG. 10 to permit the free end portion 18 of the strap to pass through. The frame 36 terminates at its front end in a laterally extending bar 38. This bar is secured to the frame by means of screws 43 extending through the bar and screwed into suitable threaded bores in a shear plate 39. The shear plate has a curved extension 41 for engaging the nose 30 of tool T. Also, the shear plate 39 has a bevelled edge portion 42. This portion is wider than buckle B, providing a shearing edge 42a along the front of a slot 40. This slot 40 is made by rabbeting the laterally extending bar 38. This slot permits the free end portion 18 to pass through it and to pass thence through slot 31 of tool T and slot 37 of the curved frame member 36. Bevelled portion 42 permits the shear plate 39 to lie closer to the strap loop 17 when tension is applied to the free end portion 18 of the strap as in FIG. 7, so that tension on the free end may be applied along a line more nearly tangential to loop 17; i.e., more nearly in the plane of buckle B. In applying tension, to the strap, the bar 38 is placed against the end of the buckle. The free end 18 of the strap which is previously clamped by cam 24 (see FIG. 6) is then pulled by rotation of handle 28, as previously described.

The attachment A includes a bracket 44 having upwardly extending sides 46, 46a providing a channel 62 open in the front and rear. In a preferred embodiment the sides 46, 46a and curved frame member 36 are integrally formed as a forged steel unitary structure. Pivotally mounted between the bracket sides 46, 46a are a cam 48 on a pivot pin 49 disposed at the upper forward position, and a lever 50 on a pivot pin 51, disposed in a rear position. The cam 48 is provided with a handle 55 which may be manually moved over in the direction of arrow 56 to rotate the cam 48 on its pivot 49 so that the cam face 61 will press against the top wall 58 of lever 50. Lever 50 has a lateral notch 52 on the under side adjacent the downwardly and inwardly slanted front end wall 53. The top wall 58 of the lever is flat. The front lower edge 54 of the end wall 53 along the notch 52 is inclined relatively to the upper front top corner line 57 of the lever.

The shape of this lever 50 is a significant feature of this embodiment of the invention. The edge 54 together with the notch 52 of the lever 50 provide a hook 59. Hence, this lever is herein called a "lever-hook" for convenience of description and also because of its function. Calling attention specifically to the hook edge 54 it will be observed that it is disposed at an angle to the axis of the lever pivot pin 51 and it is not parallel to the axis of that pivot pin. Also it will be noted that the surface of the cam 50, that is, the cam face 61, is parallel with the axis of the cam pivot pin 49. The axis of pin 49 and the axis of pin 51 are parallel with each other. But it will be noted that the surface of the cam face 61 and the hook-edge 54 are disposed at an angle relatively to each other.

In applying a pressure clamp, such as shown in FIG. 3, to a hose, for example, the clamp is placed around the hose and the assembled attachment and tool are placed in position, as shown in FIG. 6. That is, the free end portion 18 of the strap is extended through slot 40, thence through slot 31 and is clamped by cam 24 to grip the end of the strap. The nose of the attachment at the shear plate 38 engages the rear end 8 of buckle B. The loops 16, 17 of the strap are drawn taut by turning handle 28. When the strap is sufficiently taut, the handle is backed off sufficiently to permit the entire tool assembly to be turned around an axis at the nose of the tool so that the end portion 18 of the strap is bent upwardly against the rear end wall 8 of the buckle B. Or, if desired, the hose may be turned with the tool held stationary to accomplish the bending of the strap.

After the free end of portion 18 of the strap is bent upwardly so that it engages the rear end 8 of the buckle, the hook 59 of lever-hook 50 is brought into engagement with the forward end 7 of the buckle, as shown in FIG. 6. Then the handle 55 is pulled forwardly in the direction of arrow 56. The cam 48 is rotated about pin 49 as a pivot. This brings the cam face 61 into engagement with the flat top surface 58 of the hook-lever. The shape of the cam face is such that the cam applies increasingly greater force against the lever-hook so that the force exerted by the hook 59 is toward the edge 42a of cutter blade 39, that is, the hook and cutter blade exert their forces toward each other with the buckle and bent-up portion 18 of strap between them. Sufficient force is applied to handle 55 to cause the cutter blade to shear and sever the free end portion 18 of the strap and the cut is made along the top surface of the buckle. After the strap is sheared off, the cut leaves the end 19 of the strap flush with the top surface of the top wall 11 of the buckle, as shown in FIG. 4.

It is significant to note here that the cut made by the tool shown in FIGS. 6 and 8–11a, is a scissor cut. That is, the cutting force applied by the cutter edge is not applied simultaneously and uniformly from edge to edge of the strap so that the complete severance is at the same instant across the entire width of the strap. But a shearing force sufficient to cut through the strap is applied first to one edge of the strap and then continues progressively across the width of the strap in the manner of a scissor cut until the opposite edge is reached at which time the free end portion 18 of the strap is completely severed; leaving the bent up portion of the strap cut flush with the top surface of the buckle. This cutting action is illustrated in FIG. 5 which shows the cut 19a prior to complete severance of the strap and portion 18, this cut having been made progressively from the left side edge of the strap and as made by the tool illustrated in FIGS. 6 and 8–11a. This scissor cut, characteristic of the invention, is brought about by reason of the inclined edge 54 (see FIGS. 11, 11a) of the hook 59 of the lever-hook 50. This inclined edge 54 causes the cutting force to be applied progressively from edge to edge of the strap to sever the strap in the manner illustratively shown in FIG. 5. This device and manner of progressively cutting, i.e., "scissor" cutting, is very advantageous because it requires less pulling force on the handle than prior devices for cutting the strap flush with the top of the buckle in which the cut is made simultaneously across the buckle from edge to edge, i.e., a "pinch" cut. Also, less frequent replacement of the cutter blade is required in the tool of the invention. Or, stating the matter in another way, a tool made in accordance with the invention may be made of lighter material or parts than prior tools to do the same work.

The modification illustrated in FIGS. 12 and 13 accomplishes a similar cutting action, (i.e., a scissor cut), as the tool illustrated in FIGS. 6, 8–11a. All of the parts are similar in both illustrated embodiments except the cam and the lever-hook parts. In FIGS. 12 and 13 the cam and lever-hook are designated respectively by reference characters 48' and 50'. In all other respects the similar parts are designated by the same reference characters as in the other figures of the drawings.

The cam 48' (FIGS. 12, 13) has a cam face 61' which is not parallel with the axis of pin 49 but it is inclined in relationship to the pin 49. The lever-hook 50' has a flat top surface 58'. The hook edge 54' is not inclined in relationship to the top forward edge 57' but is parallel to it and the notch 52' is uniform in cross section across the width of the lever-hook 59'. The diameter of the bore 71' through which the pivot pin 51' extends is larger than the diameter of the pin. Hence, there is a substantial play between the pin and lever-hook. That is, the lever-look 50' may be inclined so that the flat top surface 58' and hence hook edge 54' may be inclined in relation to the axis of pin 51'.

The attachment as illustrated in FIGS. 12 and 13 may be mounted on the tool T as the first embodiment described and may be used in substantially the same way. After the strap of the clamp is pulled taut on the object being clamped and the tool manipulated to bring the free end portion 18 of the strap into engagement with the end of the buckle B, the handle is brought forward after the hook edge 54' is hooked over the forward end 7 of the buckle B. This forward movement of the handle causes the cam 48' to rotate about pivot pin 49. As the cam is rotated the lowest portion 72' of inclined cam face 61' presses against the flat top surface 58' of the lever-hook. This causes the lever-hook to "cock," i.e., assume a position in which the top surface 58' and hence the hook edge 54' is inclined in relationship to the axis of pin 51'. This inclined position is brought about because the diameter of bore 71' is larger than the diameter of pivot pin 51'. As the handle is moved forwardly, the edge 54' of the lever-hook applies shearing force progressively from one edge of the strap to the opposite edge so that a scissor cut is performed on the strap substantially in the same manner as described in connection with the other embodiment, i.e., a scissor cut as illustratively shown in FIG. 5.

In FIG. 14 is illustrated a unitary tool wherein the head (corresponding generally to the attachments heretofore described) is made integral with the nose 30' of the tool T'. In this embodiment the rotary cutter (see part 32, FIG. 6) is superfluous and is dispensed with.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A tool for applying a presure clamp or the like, said tool having a nose end, such pressure clamp including a buckle having opposite ends and a strap adapted to pass through said buckle and to be attached thereto, said tool comprising means for applying tension to one end of said strap so as to tighten said strap around an article to be clamped; a bar mounted on and extending across the nose end of said tool for engaging one end of said buckle while said strap is tensioned and while said strap is bent up against said end of said buckle; a shear blade mounted on and extending across the nose end of said tool in spaced relation to said bar and thereby forming a passage through which said strap passes, said shear blade being adapted to shear said strap; a lever-hook pivoted on the nose end of said tool having a hook for engaging the opposite end of said buckle, said lever-hook having a bore for a pivot pin; a first pivot pin extending through said bore and on which said lever-hook is pivotally mounted; a pivoted cam for actuating said lever-hook when said hook is in engagement with said buckle, said cam having a cam face engaging said lever-hook; a second pivot pin on which said cam is pivotally mounted; said lever-hook applying a force through said buckle against said strap and said shear blade applying a cutting force against and on the other side of said strap opposite said buckle and shearing said strap close to said buckle when said lever-hook is actuated by said cam; said lever-hook having a hook edge which is inclined relatively to the axes of said pivot pins when said cam is actuated to apply force through said buckle against said strap and causing said shear blade to shear said strap by a scissor cut progressively from one edge of said strap to the other.

2. A tool according to claim 1 in which said pivoted lever-hook has a flat smooth top surface and said cam has a cam face which is parallel with the axis of said second pivot pin and said hook edge is inclined relatively to the top surface of said lever-hook.

3. A tool according to claim 1 in which said pivoted lever-hook has a flat smooth top surface and the hook edge of said hook is parallel with the top surface of said lever-hook and the cam face of said cam is inclined relatively to the axis of said second pivot pin and the diameter of the bore through said lever-hook through which said first pivot pin extends is larger than the diameter of said first pivot pin by an amount sufficient to allow said hook edge to assume a cocked inclined position relatively to the axis of said first pivot pin.

4. An attachment for a tool for applying a pressure clamp or the like, such pressure clamp including a buckle having a front end and a rear end and a strap adapted to pass through said buckle and to be attached thereto and said tool including means for applying tension to one end of said strap so as to tighten said strap around an article to be clamped, and said tool having an elongated nose normally adapted to be positioned against the rear end of said buckle for tightening said strap; said attachment comprising a frame for at least partly encircling the nose of said tool and having a bracket provided with upwardly extending sides and open at the front end, said attachment frame also having a bar extending transversely at the front and adapted to be abutted against the buckle rear end; a shear blade disposed opposite said bar and adapted to apply a shearing force against said strap at said buckle rear end; said tool and attachment being adapted to be rotated relative to said buckle so as to bend said strap upwardly against said buckle rear end and thereby position said shear blade to sever said strap along a line close to the upper top surface of said buckle at its rear end; a pivoted lever-hook mounted between said upwardly extending sides and having a hook for engaging the front end of said buckle and for applying a force through said buckle toward said shear blade, said lever-hook having a bore therethrough for a pivot pin; a first pivot pin mounted on said sides and extending through said bore and on which said lever-hook is pivotally mounted; a pivoted cam mounted between said upstanding sides and having a cam face engaging said lever-hook for actuating said lever-hook when said hook is in engagement with said front end of said buckle; a second pivot pin mounted on said sides on which said cam is pivotally mounted; said lever-hook applying a force through said buckle against strap and said shear blade applying a cutting force against said strap opposite said buckle and shearing said strap close to said buckle when said lever-hook is actuated by said cam; said lever-hook having a hook edge which is inclined relatively to the axes of said pivot pins when said cam is actuated to apply force through said buckle against said strap and causing said shear blade to shear said strap by a scissor cut progressively from one edge of said strap to the other.

5. An attachment according to claim 4 in which said pivoted lever-hook has a flat smooth top surface and said cam has a cam face which is parallel with the axis of said second pivot pin and the hook edge of said hook is inclined relatively to the top surface of said lever-hook.

6. An attachment according to claim 4 in which said pivoted lever-hook has a flat smooth top surface and the hook edge of said hook is parallel with the top surface of said lever-hook and the cam face of said cam is inclined relatively to the axis of said second pivot pin and the diameter of the bore through said lever-hook through which said first pivot pin extends is larger than the diameter of said first pivot pin by an amount sufficient to allow said hook edge to assume a cocked inclined position relatively to the axis of said first pivot pin.

References Cited in the file of this patent

UNITED STATES PATENTS

| | | |
|---|---|---|
| 2,208,134 | McAneny | July 16, 1940 |
| 2,746,324 | Beardsley | May 22, 1956 |
| 2,837,949 | Lodholm | June 10, 1958 |
| 2,882,934 | Gerrard | Apr. 21, 1959 |